United States Patent
Reiber et al.

[11] Patent Number: 5,120,212
[45] Date of Patent: Jun. 9, 1992

[54] THICKNESS-ADJUSTING SYSTEM FOR TUBING EXTRUDER

[75] Inventors: Erwin Reiber, Karlsfeld; Wolfgang Walter, Munich, both of Fed. Rep. of Germany

[73] Assignee: Krauss-Maffei Aktiengesellschaft, Munich, Fed. Rep. of Germany

[21] Appl. No.: 605,830

[22] Filed: Oct. 30, 1990

[30] Foreign Application Priority Data

Nov. 2, 1989 [DE] Fed. Rep. of Germany ....... 3936496

[51] Int. Cl.$^5$ .............................................. B29C 47/00
[52] U.S. Cl. ................................... 425/141; 425/466
[58] Field of Search ................ 425/141, 113, 150, 466

[56] References Cited

U.S. PATENT DOCUMENTS

| | | | |
|---|---|---|---|
| 3,914,356 | 10/1975 | Dembiak et al. | 425/113 |
| 3,923,439 | 12/1975 | Isley et al. | 425/466 |
| 4,124,342 | 11/1978 | Akatsuka et al. | 425/466 |
| 4,368,026 | 1/1983 | Budel et al. | 425/466 |
| 4,721,447 | 1/1988 | Erckmann | 425/466 |
| 4,741,686 | 5/1988 | Cazzani et al. | 425/466 |
| 4,882,104 | 11/1989 | Dobrowsky | 425/141 |
| 4,886,438 | 12/1989 | Börger et al. | 425/141 |
| 4,978,289 | 12/1990 | Maejima | 425/466 |

FOREIGN PATENT DOCUMENTS

| | | |
|---|---|---|
| 0032715 | 7/1981 | European Pat. Off. . |
| 2113054 | 9/1972 | Fed. Rep. of Germany . |
| 3304865 | 8/1984 | Fed. Rep. of Germany . |
| 3445066 | 6/1986 | Fed. Rep. of Germany . |
| 3512097 | 10/1986 | Fed. Rep. of Germany . |
| 8526188 | 1/1987 | Fed. Rep. of Germany . |
| 8701877 | 5/1987 | Fed. Rep. of Germany . |
| 8704664 | 7/1987 | Fed. Rep. of Germany . |
| 2302188 | 9/1976 | France . |
| 0028374 | 3/1979 | Japan ................... 425/466 |
| 59-199220 | 11/1984 | Japan . |

OTHER PUBLICATIONS

Lohrbächer et al., "Wanddicksteuerungen . . . ", (Kunststoffe, vol. 64, 1974, Issue 9).
K. J. Cosack, "Viel Licht, Wenig Schatten . . . ", (Maschinenmarkt, Würzburg 95).
Orzechowki et al., "Automatische Ultraschall Wanddickenmessung", (Kunststoffe 77).
K. V. Anderson, "Wanddickenregelung . . . ", (Kunststoffberater, Dec. 1982).
"Scanner SC 88", . . . (Inoex GmbH) . . . .
E. Musshafen, "Messen und Regeln der Wanddicke . . . ", (Kunststoffe, vol. 64, Issue 11).
R. Schick, "Prozessmesstechnik . . . ", (REHAU, 1978).
"Automatische Rohrkopfzentrierung", (Kunststoffe 73, (1983)).

*Primary Examiner*—Jay H. Woo
*Assistant Examiner*—C. Scott Bushey
*Attorney, Agent, or Firm*—Herbert Dubno; Andrew Wilford

[57] ABSTRACT

An extruder has a housing, a core centered on an axis, and a sleeve spacedly coaxially surrounding the core and defining therewith an outlet passage. Thus molten material emerges from the passage as a tube. A plurality of radially extending and angularly spaced adjustment screws are threaded into the housing and radially engage the sleeve so that these screws can be screwed in and out to radially displace the sleeve on the housing and thereby adjust the passage. A detecting unit axially downstream of the extruder includes at least one sensor for measuring the thickness of the tube at a plurality of angularly spaced locations and for producing an output corresponding to the respective measured thickness. An adjustment unit including at least one rotary tool engageable with the screws can selectively rotate same and screw same in the housing. A controller is connected between the detecting unit and adjuster for rotating a screw out when the sensor output for the respective portion of the tube indicates same is too thin and for screwing a screw in when the sensor output for the respective portion of the tube indicates same is too thick.

8 Claims, 1 Drawing Sheet

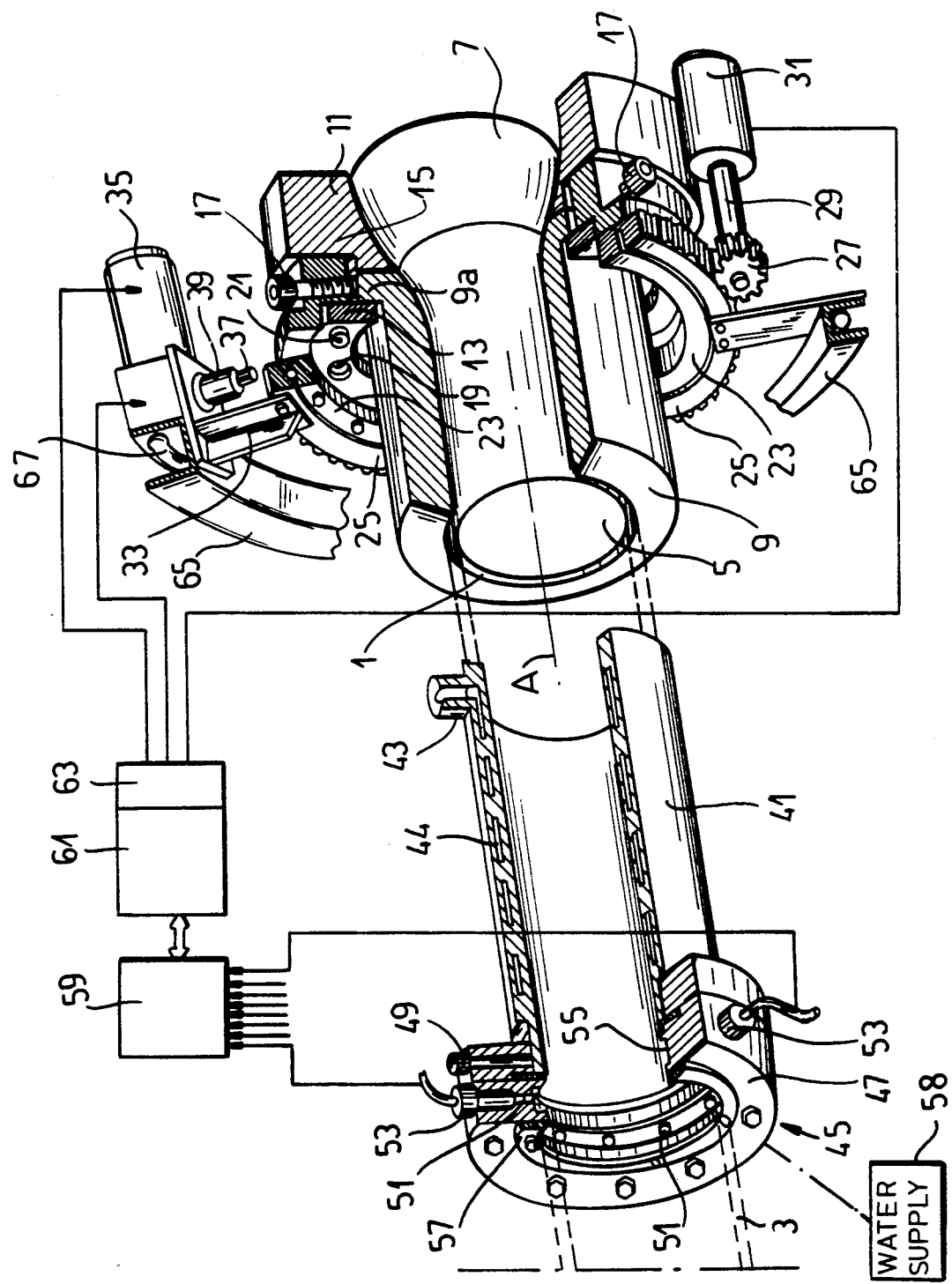

THICKNESS-ADJUSTING SYSTEM FOR TUBING EXTRUDER

FIELD OF THE INVENTION

The present invention relates to a tubing extruder. More particularly this invention concerns a system for adjusting the wall thickness of tubing produced in an extruder.

BACKGROUND OF THE INVENTION

A standard tubing extruder has a nozzle forming an annular and normally circular outlet passage. The inner wall of this passage is defined by a normally solid mandrel and the outer wall is defined at least at its downstream end by an adjustment sleeve. This sleeve is radially deformable or shiftable and is braced by a plurality of radially extending and angularly equispaced adjustment screws against a massive outside holding ring. Thus it is possible by advancing and retracting the screws to at least limitedly deform or shift the adjustment sleeve and, therefore, change the radial dimension of the extruder outlet.

In a standard system the finished product is subject to periodic measurements and the screws on the extruder are manually advanced or retracted, as necessary, to eliminate thick or thin spots in the extruded tubing and, therefore, make the product more uniform in wall thickness. Clearly such a system is labor intensive. In addition there is a substantial lag time between ascertaining that a correction is needed, making the correction, and having the correction show up in the finished product. In the meanwhile a large quantity of subtolerance tubing is produced.

It has been suggested in German utility models 8,526,188 and 8,701,877 as well as in German patent documents 2,113,054 and 3,512,097 respectively of K. Schwarze and M. Loozenski to provide an extruder head with a sleeve having a plurality of angularly spaced actuators taking the place of the prior-art screws. Similarly German utility model 8,704,664 shows an arrangement having a complex fitting replacing the downstream end of the extruder. All these systems require that the extruder be largely rebuilt in order to eliminate the manual part of the adjustment operation. Other systems such as described in German patent document 3,304,865 of E. Schwab et al rely on more complex control arrangements also not adaptable to existing equipment.

OBJECTS OF THE INVENTION

It is therefore an object of the present invention to provide an improved system for adjusting the gap of a tube extruder.

Another object is the provision of such an improved system for adjusting the gap of a tube extruder which overcomes the above-given disadvantages, that is which can be used on an existing manual-adjustment extruder.

A further object is to provide such an improved adjustment system.

SUMMARY OF THE INVENTION

The instant invention is used in combination with an extruder having a housing, a core centered on an axis, and a sleeve spacedly coaxially surrounding the core and defining therewith an outlet passage. Thus molten material emerges from the passage as a tube. A plurality of radially extending and angularly spaced adjustment screws are threaded into the housing and radially engage the sleeve so that these screws can be screwed in and out to radially displace the sleeve on the housing and thereby adjust the passage. In accordance with the invention a detecting unit axially downstream of the extruder includes at least one sensor for measuring the thickness of the tube at a plurality of angularly spaced locations and for producing an output corresponding to the respective measured thickness. An adjustment unit including at least one rotary tool engageable with the screws can selectively rotate same and screw same in the housing. A controller is connected between the detecting and adjuster for rotating a screw out when the sensor output for the respective portion of the tube indicates same is too thin and for screwing a screw in when the sensor output for the respective portion of the tube indicates same too thick.

Thus the system of this invention can be retrofitted on an existing manual-adjust extruder to provide it with totally automatic and sensitive adjustment of tube thickness. There is no need to fit the extruder with an expensive ne head; instead the adjustment rig is just attached over the existing adjustment screws.

According to another feature of this invention the adjuster includes an annular guide carried on the housing centered on the axis adjacent the screws, a carriage angularly displaceable around the guide and carrying the tool, and a positioner for displacing the carriage angularly around the guide and placing the tool in positions in line with the respective screws. The carriage includes a ring centered on the guide and rotatable thereon about the axis and the ring is formed with teeth and the positioner includes a motor carrying a gear meshing with the teeth. The tool itself includes means for radially displacing itself relative to the carriage.

It is also possible according to this invention for there to be more than one such tool. In this case each tool can be angularly fixed and in constant mesh with the respective screw so that it need not be radially advanced and retracted.

In accordance with a further feature of this invention the detector includes an array of such sensors angularly equispaced about the tube and the sensors are ultrasonic detectors. Means is provided for maintaining a body of liquid in contact between the sensors and the tube for transmitting the sound waves. What is more the detecting system can be moved oscillatingly around the axis.

BRIEF DESCRIPTION OF THE DRAWING

The above and other objects, features, and advantages will become more readily apparent from the following, reference being made to the accompanying drawing whose sole figure is a partly sectional and diagrammatic view of the system according to this invention.

SPECIFIC DESCRIPTION

As seen in the drawing an extruder has a central mandrel 5 and an outer sleeve 9 respectively mounted on a carrier 7 and a housing 11 and together forming a circularly annular outlet orifice or passage 1 centered on an axis A. The sleeve 9 is somewhat elastically deformable or movable to move its center and change the radial dimension of this passage 1 and, thereby, locally change the radial thickness of a tube shown in dashed lines at 3 that is extruded from this passage 1.

The rear end of the sleeve 9 has a radially outwardly projecting annular flange 9a that fits within a mounting ring 15 centered on the axis A and secured by axially extending bolts 19 to the housing 11. Another ring 13 is pressed by bolts 21 threaded into the ring 15 against the axial front face of the flange 9a to hold this ring 13 axially in place on the housing 11.

Eight radially extending and angularly equispaced allen-type adjustment screws 17 are threaded through the ring 15 and radially engage the sleeve 9 at its flange 9a. These screws 17 can be tightened or loosened to adjust the cross-sectional shape and/or radial position of the sleeve 9. They are a standard feature of a typical prior-art extruder and are intended for manual adjustment of the passage size.

The tube 3 emerges from the nozzle passage 1 into a cooling sleeve 41 that receives a coolant liquid at an inlet 43 so it can flow along passages 44. This sleeve 41 is held in a vacuum chamber so that the tube 3 swells outward and presses itself against its inner wall. Thus as the tube 3 moves downstream it hardens to an outside diameter accurately determined by the inside diameter of the sleeve 41. Typically the tube 3 enters further such calibrating sleeves after exiting the illustrated sleeve, or at least passes through further cooling/curing stages.

According to this invention an inner bearing or guide ring 23 is bolted to the mounting ring 15 and carries an outer carriage ring 25 in turn carrying radially projecting support brackets 33 and formed with external teeth. A motor 31 fixed on the housing 11 has an output shaft 29 carrying a pinion 27 meshing with the toothed ring 25 to rotate it about the axis A on the ring 23. The brackets 33 in turn carry an annular support beam 65 containing pneumatic and electric control lines 67 for a motor 35 and for an axially extensible chuck 39 carrying a radially oriented allen wrench 37 shaped to fit in the screws 17. Thus the motor 31 can position the tool 27 radially in line with one of the screws 17, then the chuck 39 can extend to fit this tool 37 to the respective screw 17, and then the motor 35 can rotate the tool 37 in either direction to screw the respective screw 17 in or out.

In addition the downstream end of the cooling sleeve 41 is provided with a sensing collar 45 comprising a ring 47 mounted on the tube 41 centered on the axis A and formed with a radially inwardly open groove 55 and with eight angularly equispaced and radially extending holes 51 each housing a respective ultrasonic sensor 53. The groove 55 is flanked by elastomeric seals 57 and means 58 is provided for supplying water to the groove 55. These sensors 53 operate as described in "Prozessmesstechnik" by Reinhard Schick (*Mitteilungen* 16/78), in "Scanner SC 88" (Inoex GmbH), "Messen und Regelnder Wanddicke von extrudierten Rohren" by E. Musshafen (*Kunstoffe* Vol 64, 1974 pp 63ff), "Wanddickenregulungen mit Ultraschall" by K. V. Andersen (*Kunstoffberater* December 1982), "Automatische Ultraschall-Wanddickenmessung bei der Rohrextrusion" by J. Orzechowski, "Viel Licht wenig Schatten" by K. Cosack (*Maschinenmarkt* 1989), and "Wanddickensteuerungen fur das Blasformen" by V. Lohrbacher et al (*Kunstoffe* vol. 64, 1974, pp 438ff). They produce an output signal from which can be derived the thickness of the portion of the tube 3 they are aimed at by applying ultrasonic vibrations to the tube via the body of water in the groove 55.

These outputs are fed to an input device 59 in turn connected to a programmed controller 61 having an output device 63 that operates the motor 31, the motor 35, and the extensible chuck 39. The controller 61 is a microprocessor-type computer that has a preset program.

Thus according to this invention each of the sensors 53 is directly axially downstream of a respective one of the screws 17. When a one of the sensors 53 determines that the respective portion of the wall of the tube 3 is too thick or thin, the controller 61 operates the motor 31 to move the tool 37 to alignment with the respective screw 17, the chuck 39 is extended, and the motor 35 is operated to rotate this screw 17 in or out, depending on which adjustment is needed.

We claim:
1. In combination with an extruder having:
   a housing;
   a core centered on an axis;
   a sleeve spacedly coaxially surrounding the core and defining therewith an outlet passage, whereby molten material emerges from the passage as a tube; and
   a plurality of radially extending and angularly spaced adjustment screws threaded into the housing and radially engaging the sleeve, whereby the screws are screwed in and out to radially displace the sleeve on the housing and thereby adjust the passage, a centering apparatus comprising:
   detecting means axially downstream of the extruder including at least one sensor for measuring thickness of the tube at a plurality of angularly spaced locations and for producing an output corresponding to the respective measured thickness;
   adjusting means including
      an annular guide carried on the housing centered on the axis adjacent the screws,
      a carriage angularly displaceable around the guide,
      at least one rotary tool carried on the carriage and engageable with the screws for selectively rotating same and screwing same in the housing, and
      positioning means for displacing the carriage angularly around the guide and placing the tool in positions in line with the respective screws; and
   control means connected between the detecting, positioning, and adjusting means for rotating a screw out when the sensor output for the respective portion of the tube indicates same is too thin and for screwing in when the sensor output for the respective portion of the tube indicates same is too thick.

2. The extruder centering apparatus defined in claim 1 wherein the carriage includes a ring centered on the guide and rotatable thereon about the axis, the ring being formed with teeth and the positioning means including a motor carrying a gear meshing with the teeth.

3. The extruder centering apparatus defined in claim 2 wherein the tool includes means for radially displacing itself relative to the carriage.

4. The extruder centering apparatus defined in claim 1 wherein there is more than one such tool.

5. The extruder centering apparatus defined in claim 1 wherein the detecting means includes an array of such sensors angularly equispaced about the tube.

6. The extruder centering apparatus defined in claim 5 wherein the sensors are ultrasonic detectors.

7. The extruder centering apparatus defined in claim 6 wherein the detecting means includes
   means for maintaining a body of liquid in contact with and between the sensors and the tube.

8. In combination with an extruder having:

a housing;

a core centered on an axis;

a sleeve spacedly coaxially surrounding the core and defining therewith an outlet passage, whereby molten material emerges from the passage as a tube; and a plurality of radially extending and angularly equispaced adjustment screws threaded into the housing and radially engaging the sleeve, whereby the screws are screwed in and out to radially displace the sleeve on the housing and thereby adjust the passage, a centering apparatus comprising:

adjusting means axially downstream of the extruder including an array of angularly equispaced sensors for measuring thickness of the tube at respective angularly spaced locations and producing outputs corresponding to the respective thicknesses;

detecting means including an annular guide surrounding the sleeve and centered on the axis adjacent the screws, a carriage displaceable angularly on the guide through positions adjacent each of the screws, a rotary tool carried on the carriage, means for radially extending the tool inward into locking engagement in any of the positions of the carriage with the respective screw for selectively rotating same and screwing same in the housing, and drive means for angularly displacing the tool along the guide and rotating the tool when in contact with the screws; and control means connected between the detecting and adjusting means for rotating a screw out when the sensor output for the respective portion of the tube indicates same is too thin and for screwing a screw in when the sensor output for the respective portion of the tube indicates same is too thick.

* * * * *